United States Patent
Finch, II et al.

(10) Patent No.: US 6,282,567 B1
(45) Date of Patent: Aug. 28, 2001

(54) APPLICATION SOFTWARE ADD-ON FOR ENHANCED INTERNET BASED MARKETING

(75) Inventors: Curtis L. Finch, II; William Leake; William Miller; Christopher B. Anderson, all of Austin, TX (US)

(73) Assignee: Journyx, Inc., Austin, TX (US)

( * ) Notice: Subject to any disclaimer, the term of this patent is extended or adjusted under 35 U.S.C. 154(b) by 0 days.

(21) Appl. No.: 09/339,428

(22) Filed: Jun. 24, 1999

(51) Int. Cl.$^7$ ........................................ G06F 15/16
(52) U.S. Cl. ........................ 709/219; 709/224; 707/3; 707/10
(58) Field of Search ................................ 709/219, 223, 709/224; 707/10, 3

(56) References Cited

U.S. PATENT DOCUMENTS

| | | |
|---|---|---|
| 5,402,336 | 3/1995 | Spiegelhoff et al. . |
| 5,634,051 | 5/1997 | Thomson . |
| 5,701,469 | 12/1997 | Brandi et al. . |
| 5,761,418 | 6/1998 | Francis et al. . |
| 5,796,952 * | 8/1998 | Davis et al. .................. 709/224 |
| 5,802,524 | 9/1998 | Flowers et al. . |
| 5,832,428 | 11/1998 | Chow et al. . |
| 5,848,397 * | 12/1998 | Marsh et al. ................ 705/14 |
| 5,905,862 * | 5/1999 | Hoekstra ...................... 709/202 |
| 5,918,014 | 6/1999 | Robinson . |
| 5,920,854 | 7/1999 | Kirsch et al. . |
| 5,951,642 * | 9/1999 | Onoe et al. ................... 709/224 |
| 5,987,454 | 11/1999 | Hobbs . |
| 5,987,464 | 11/1999 | Schneider . |
| 6,006,197 | 12/1999 | d'Eon et al. . |
| 6,006,217 | 12/1999 | Lumsden . |
| 6,006,252 | 12/1999 | Wolfe . |
| 6,012,066 | 1/2000 | Discount et al. . |
| 6,026,433 | 2/2000 | D'Arlach et al. . |
| 6,031,537 | 2/2000 | Hugh . |
| 6,036,601 * | 3/2000 | Heckel ........................... 463/42 |
| 6,041,326 | 3/2000 | Amro et al. . |
| 6,049,801 | 4/2000 | Whitmyer, Jr. . |
| 6,052,670 | 4/2000 | Johnson . |

* cited by examiner

Primary Examiner—Mehmet B. Geckil
(74) Attorney, Agent, or Firm—Bruce Garlick

(57) ABSTRACT

A method for performing enhanced marketing operations upon the Internet enables a company web server to employ a client web server in its marketing efforts. An application program installs upon a client web server coupled to the Internet. An application program add-on also installs upon the client web server and becomes primarily responsible for the ongoing marketing efforts provided. During the installation process (and thereafter), client information is collected by the application program and/or the application program add-on at the client web server. The application software/application software add-on then relays this client information to the company web server across the Internet for further use. Marketing content is then downloaded from the company web server to the client web server across the Internet. After its receipt, the marketing content is supported upon the client web server to support the marketing efforts of the company. In one embodiment of the present invention, the marketing content is one or more advertisements that are displayed upon the client web server. In another embodiment of the present invention, the marketing content is search engine content. Search engine content is used by the application program add-on to create a search engine content that include content relating to search terms or phrases. Once these search engine content pages are created, they will be spidered by at least one search engine. The content and location of these search engine content pages will cause the search engines to return a desired link for particular a selected search term or phrase.

26 Claims, 7 Drawing Sheets

APPLICATION SOFTWARE ADD-ON FOR ENHANCED INTERNET BASED MARKETING

BACKGROUND

1. Technical Field

The present invention relates generally to Internet based software applications; and more particularly to application software that is downloaded across the Internet and operable across the Internet.

2. Related Art

The structure of the publicly accessible Internet is generally known to be a global computer network that includes a large number of computer systems that are interconnected by a large number of communication links. Digital communications are serviced on the Internet according to the Internet Protocol/Transfer Control Protocol (TCP/IP) standards and other associated networking standards. Thus, communications across the Internet are substantially standardized to facilitate inter-computer communications. A presence on the Internet is often referred to as a "web site" at which content (e.g., HTML files, audio files, video files, executable files, etc.) is accessible. A web site may be a dedicated stand-alone "web-server" or may simply be an IP address serviced by a service provider. Users of the Internet often use a "browser" or other software to view content contained at web sites. Such content is downloaded from the web site to the user across the Internet infrastructure.

The Internet was originally constructed under a series of government projects so that it could facilitate the exchange of information. The Internet and its associated resources now serve as a vast storage facility for information. From that original beginning, however, the Internet has evolved to support many varied communication services and business operations. These communication services and business operations include electronic mail, voice over IP, virtual private networking, electronic commerce, advertising and a great number of other business activities.

However, because the Internet is unlike any prior business environment, marketing of services and products over the Internet is typically done by trial and error. While advertising via radio, television and newspaper has been refined over the years, advertising via the Internet is in its infancy. Advertisers have great difficulty in determining where to place and maintain ads on the Internet. Further, because it is difficult to determine whether a desired customer base views the advertisements after their placement, advertising on the Internet has been a hit-or-miss proposition.

Success in conducting business and advertising upon the Internet requires that "Internet traffic" reach a particular web site or set of web sites. Thus, mechanisms must be put in place that cause "web surfers" and other Internet users to reach a desired web site or set of web sites. Further, to effectively conduct business on the Internet, a desired set of Internet users that are likely to be affected by the advertisement must reach the particular web site or set of web sites. In a particular advertising example, an electronics retailer desires that all Internet users seeing to purchase electronics over the Internet visit the retailer's web site. Thus, the electronic retailer should purchase ad space on a particular web site known to be frequented by Internet users that may purchase electronics on-line. These users should then be presented with a link to the web site of the retailer.

Other Internet sites of interest to businesses are "portals" and "search engines". Portals are organizations that have a web presence that have links users to other web sites. In order to have a link placed on a portal's site, a business may pay the portal to create and maintain the link. Search engines are organizations which have a web presence and from which Internet content may be searched. In a typical search engine, an Internet user enters one or more search term and requests that the search engine find and list Internet sites relating to the search terms, such Internet sites listed in order. The search engine then returns a list of sites corresponding to the search term(s), typically providing links to the Internet sites. The Internet user may then link to the Internet sites. Thus, for the example of the electronics retailer, it would be desirable for the Internet site of the electronics retailer to be returned based upon a search under the search term "electronics". Further, it would be very desirable for the Internet site of the electronics retailer to be the first site listed in the search.

Search engines have recognized that many operators of Internet sites would like their sites to be listed first in such a search. Thus, they take steps in attempt to reach such a result. One such technique that has been tried is to populate a number of web pages under the control of a web site operator. However, search engine operators desire that their search engines provide meaningful search results. Thus, the search engine operators devised different techniques for determining how their search engines would rank sites produced in a search. Currently, differing search engines use different criteria in determining what web sites a search term or set of search terms will return. However, the importance of a web site being identified in a search only increases.

Thus, there is a need in the art for a system that causes a web site operator to have a greater marketing presence on the Internet, such greater marketing presence relating to the frequency at which a corresponding web site is visited by a desired set of users, the frequency at which the web site is identified in a web search based upon a desired search term or set of search terms and the manner in which beneficial ads are placed across the Internet.

SUMMARY OF THE INVENTION

Thus in order to overcome the shortcomings of prior Internet marketing techniques, a method for performing enhanced marketing operations upon the Internet enables a company web server to employ a client web server in its marketing efforts. In an operation according to the present invention, an application program is installed upon a client web server coupled to the Internet. The application program may be a web installed application that is downloaded from the company web server by the client web server. Alternately, the application program may be loaded using alternate methods.

During installation of the application program, an application program add-on also installs upon the client web server. This application program add-on becomes primarily responsible for the ongoing marketing efforts provided. During the installation process (and thereafter), client information is collected by the application program and/or the application program add-on at the client web server. The application software/application software add-on then relays this client information to the company web server across the Internet for further use. Marketing content is then downloaded from the company web server to the client web server across the Internet. After its receipt, the marketing content is supported upon the client web server to support the marketing efforts of the company. Alternately, the marketing content may be received with the application software/ application software add-on itself or may be downloaded from a specified marketing content web site.

In one embodiment of the present invention, the marketing content is one or more advertisements that are displayed upon the client web server. These advertisements may be displayed to a user of the application program. However, the advertisements may also be supported upon a web page serviced by the client web server so that they are displayed to visitors to the corresponding client web server web pages.

In maintaining advertisements upon the client web server, the application software add-on may, from time to time, retrieve new advertisements from the company web server or from a specified marketing content web site. Downloading such new advertisements may be triggered by various advertisement update events. One update event would be triggered if the prior advertisements failed to produce Internet traffic for the company. Another update event may be simply a period update trigger at which time the advertisements are automatically updated. The content of the advertisements downloaded from the company web server may be selected based upon the client information. In this manner, advertising content will correlate to the type of users/visitors expected at the client web server.

In another embodiment of the present invention, the marketing content is search engine content. Search engine content is used by the application program add-on to create search engine content pages that are based upon the search engine content. These search engine content pages are supported upon the client web server and include content relating to search terms or phrases. Once these search engine content pages are created, they will be spidered by at least one search engine. This spidering may be accomplished via direct interaction with the search engine site or via interaction with the company web server, which sends a spidering request to the search engine site. The content and location of these search engine content pages will cause the search engines to return a desired link for particular a selected search term or phrase.

In a favorable operation according to the present invention, search engine content pages will be created upon a plurality of client web servers, each of which includes content for particular search terms and/or phrases. The search engines will then spider the search engine content pages. Based upon the content of these search engine content pages, the search engines will return corresponding links for a search of the search terms and/or phrases.

Thus, companies desiring to "own" particular search terms and/or phrases may use the teachings of the present invention to reach their desired goals. In order to produce desired search results, many search engine content pages located on many different client web servers will be populated with search engine content pages with the desired search term and/or phrase. Typically, these search engine content pages will include a link to a corresponding web site. Because search criteria of the various search engines differs, and changes over time, the search engine content pages may be frequently altered to produce the desired results.

In initiating spidering, the application add-on may request a search engine to spider the search engine content page. This spidering request may be accomplished by the application software add-on by sending a spidering request to the search engine. Alternatively, the application software add-on may send a request to the company web server regarding spidering the search engine content page. The company web server will then send a spidering request to the search engine, requesting that the search engine spider the search engine content page.

In another operation of the application software add-on of the present invention, the application software add-on detects whether a user or a search engine spider accesses a search engine content page. If a search engine spider attempts access of the search engine content page, the application software add-on allows the spider to access the page. However, if a user accesses the search engine content page, the application software add-on redirects the user to the company web server or to a client web server.

Moreover, other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
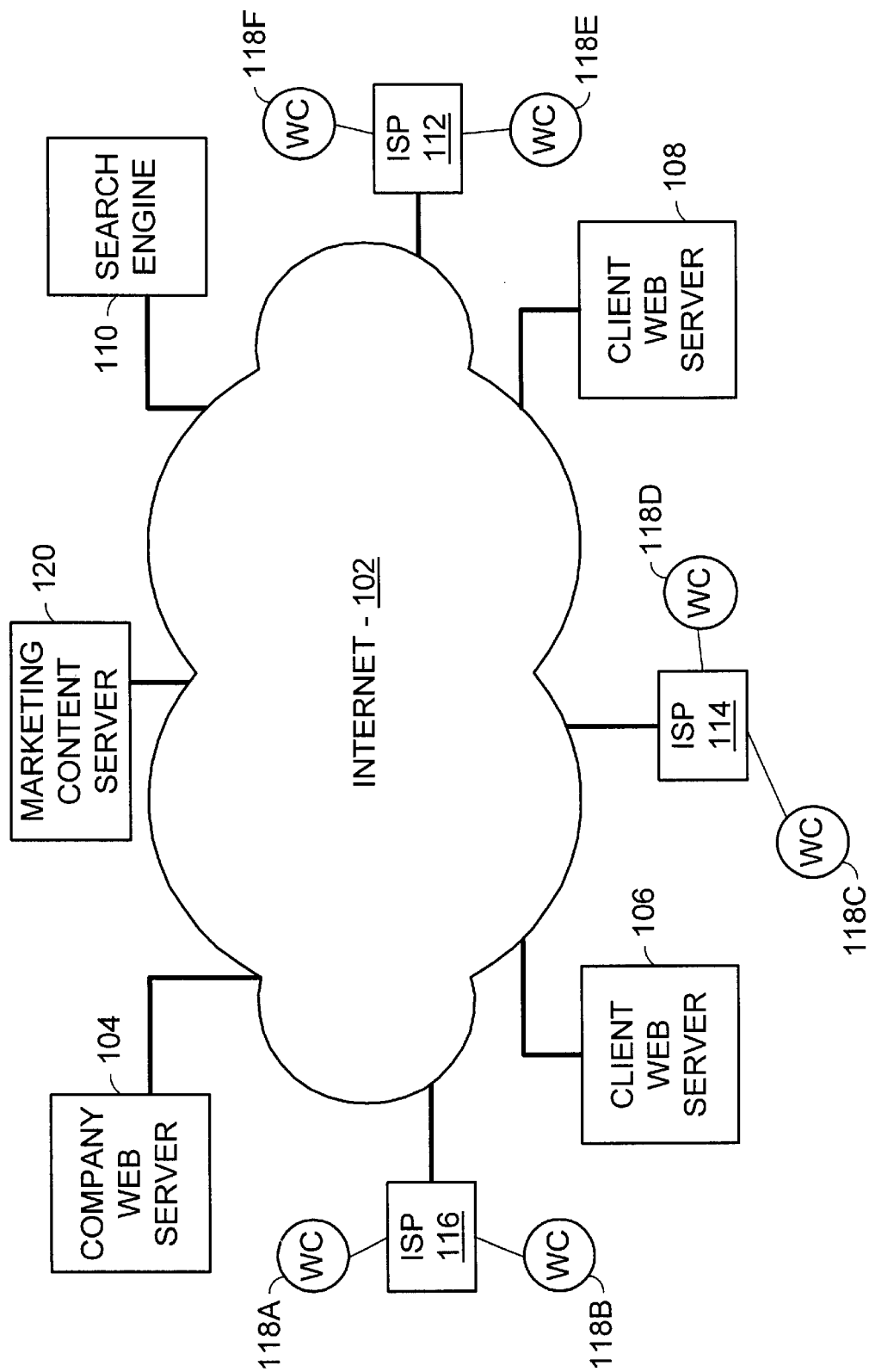
FIG. 1 is a system diagram illustrating an Intranet installation in which application software and an application software add-on constructed according to the present invention are installed and operated to enhance Internet marketing.

FIG. 1 is a system diagram illustrating an Intranet installation in which application software and an application software add-on constructed according to the present invention are installed and operated to enhance Internet marketing. The structure and operation of the Internet 102 is generally known and will not be described further herein except as to expand upon the principles of the present invention. A company web server (CoWS) 104 couples to the Internet 102. Further, client web servers (ClWSs) 106 and 108 also couple to the Internet 102 and may access the CoWS 104 via the Internet 102. A search engine 110 also couples to the Internet 110 and is operated by a search engine operator. Moreover, a marketing content web server 120 also couples to the Internet 102 and may be accessed during operations according to the present invention.

Web clients (WCs) 118A–118F couple to the Internet 102 via Internet Service Providers (ISPs) 112, 114 and 116. WCs could also couple to the Internet via the CoWS 104 and the ClWSs 106 and 108 although none are shown in FIG. 1 coupled in such a fashion. In a common operating scenario, a WC, e.g., WC 118D communicates with the search engine 110 seeking Internet content relating to one or more search terms or phrases. The search engine 110 has previously "spidered" many web sites across the Internet 102 and compiled information on the web sites via such spidering. Thus, when the WC 118D "searches the Internet" based upon the search terms or phrases, the search engine returns links to web sites that correspond to the search. These web sites may be addressed using a uniform resource identifier (URI) or an IP address.

According to the present invention, application software is downloaded from the CoWS 104 to ClWSs 106 and 108. This application software may be referred to as a web installed application (WIA) because it is preferably installed across the Internet 102. However, the application software could also be installed via other conventional means such as CD-ROM, diskette, tape, etc. During installation of the application software, an application software add-on is also installed. This application software add-on, in conjunction with the application software, performs enhanced Internet marketing operations. These operations will be described further with reference to FIGS. 2 through 6.

Figure 2:
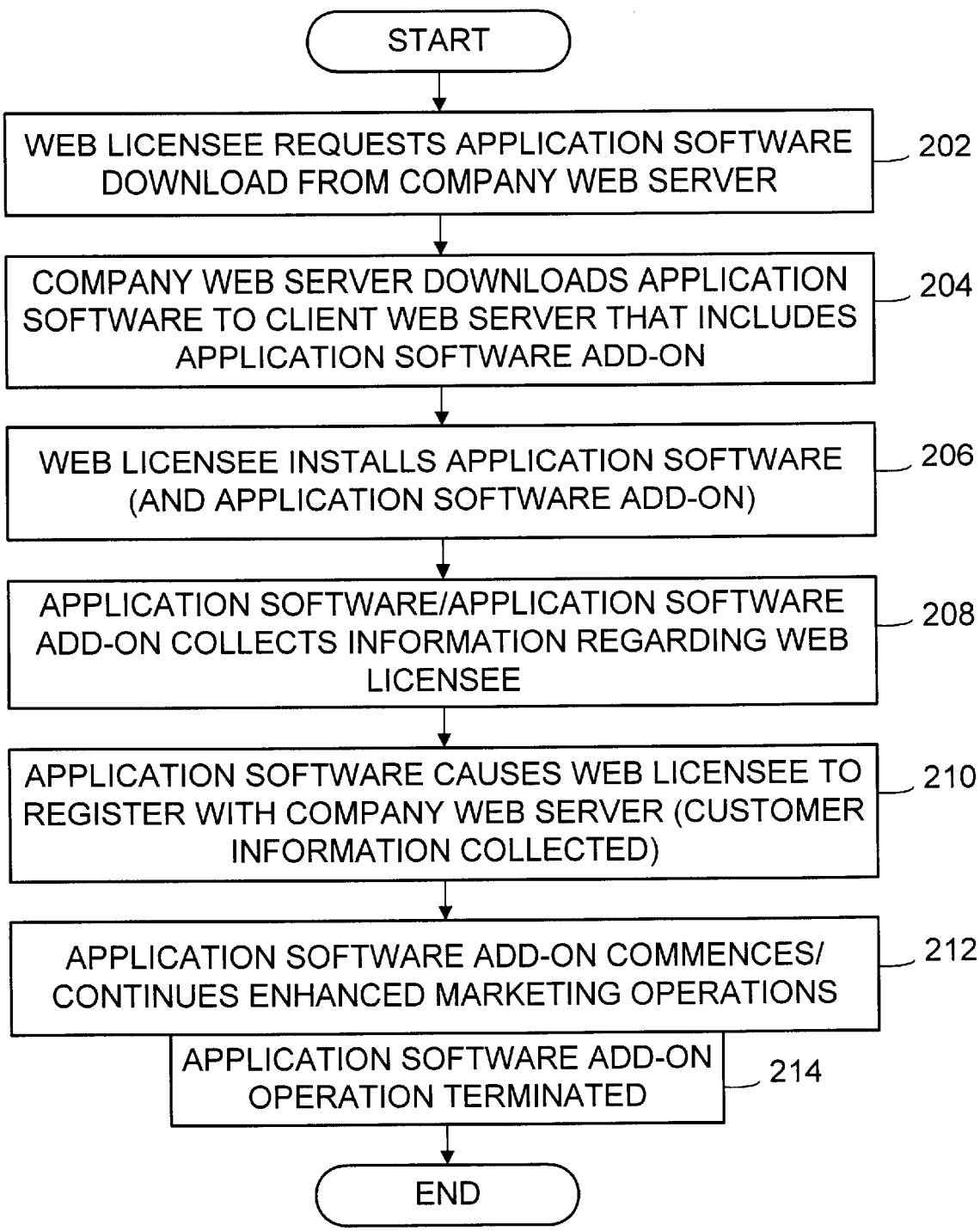
FIG. 2 is a logic diagram illustrating operation of the application software and application software add-on of the present invention.

FIG. 2 is a logic diagram illustrating operation of the application software and application software add-on of the system of FIG. 1 according to the present invention. In one operation, web client 118D desires to download and use application software provided by the CoWS 104. With reference to both FIG. 1 and FIG. 2, a user of a ClWS, e.g., 108 requests a download of the application software from CoWS 104 (step 202). In a particular implementation of the present invention, the application software is a distributed timekeeping application, which allows a plurality of employees to enter time to the ClWS 108 via the Internet 102. In initiating the download, the ClWS 108 accesses a web page supported by the CoWS 104 and enables an appropriate link.

The CoWS 104 and ClWS 108 interact to transfer an executable file across the Internet 102 from the CoWS 104 to the ClWS 108 (step 204). With the executable file transferred across the Internet from the CoWS 104 to the ClWS 108, the ClWS 108 then initiates operation of the executable file to install the application software (step 206). Upon execution of the executable file, the application program commences its installation upon the CoWS 104. During its installation, however, the application program not only installs the components it will require it also initiates installation of an application program add-on.

Further, during the installation of the application program, the application software and/or application software add-on collects information regarding the licensee (step 208) and returns it to the CoWS 104 (step 210). This information will identify the licensee operating the ClWS 108 and will provide additional information regarding the licensee based upon queries provided to the licensee during the installation. Such queries will determine the size of the licensee, the number of potential web users of the application software and additional information that is relevant to the companies marketing.

Once the application program completes its installation, the application software add-on continues its operation upon the ClWS 108 (step 212). Operations of the application software add-on, either by itself or in combination with the application software are described further with reference to FIGS. 3 through 6. These operations include: (1) displaying advertising content to the users of the ClWS 108; (2) creating web page content upon the ClWS 108 that will alter the operation of search engines for particular search terms and phrases to cause the search engines to return particular web pages, to cause the search engine to spider web pages created on the ClWS 108; and (3) additional operations relating to Internet based marketing. These operations may include downloading marketing content (e.g., advertisements, search engine content page content, etc.) from the marketing content server 120. Once the operation of the application software add-on is complete, operation terminates (step 214).

Figure 3:
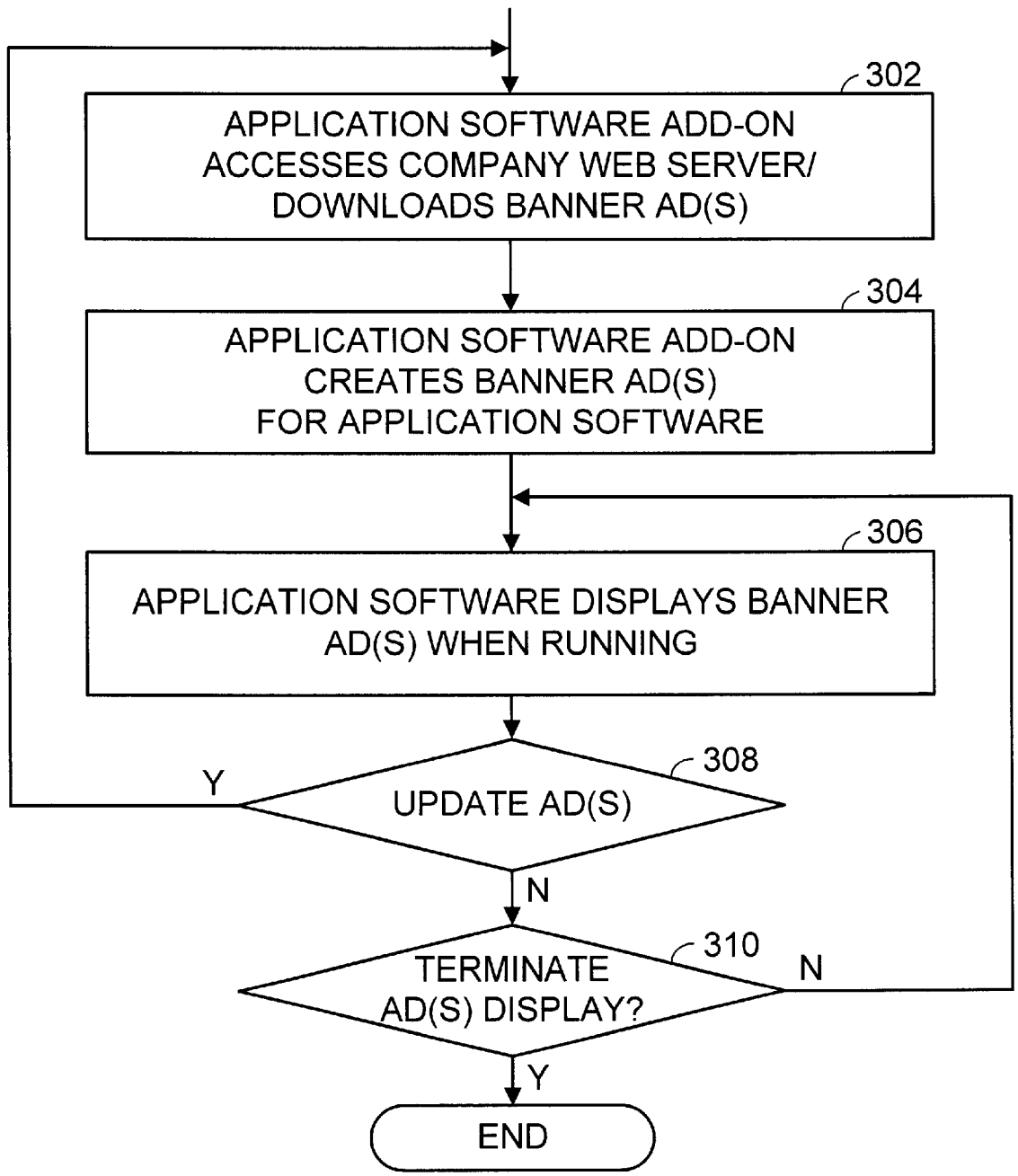
FIG. 3 is a logic diagram illustrating particular operations of the application software and application software add-on of the present invention in displaying banner ads.

FIG. 3 is a logic diagram illustrating particular operations of the application software and application software add-on of the present invention in displaying banner ads (one or more ads) on the ClWS. According to the operations of FIG. 3, when the application software add-on is first enabled upon a ClWS, e.g., ClWS 108, the application software add-on accesses the CoWS 104 via the Internet 102 to download banner ads that will be displayed upon the ClWS 108 (step 302). These banner ads may also be downloaded from the marketing content server 120. Further, these banner ads may have been downloaded with the application software and/or application software add-on during the initial installation. These ads may be those for the company operating the ClWS 108 (licensor/provider of the application software) or may be for paid advertisers (those that pay advertising fees to the company operating the CoWS). In either case, based upon the downloaded ads, the application software add-on creates banner ads for display upon the ClWS 108 (step 304).

These banner ads may be for display only to users of the application software with the ads being displayed upon use of the application software. For example, in an installation wherein the application software is a distributed timekeeping system, each user, e.g. WC 118B, of the system periodically accesses the application software upon the ClWS 108 across the Internet 102. The advertisements are displayed to the WC 118B when the WC 118B accesses the application program (step 306). Alternately, the banner ads may be displayed within other web pages that were created by the application software or the application software add-on. In such case, the banner ads are displayed to any WC that accesses the corresponding web page.

After displaying the banner ads for a period of time, the application software add-on may determine that updating the ads is required (step 308). If updating of the ads is required, new ads are downloaded from the CoWS 104 (step 302). If not, the application software add-on determines whether to continue displaying the ads (step 310). Ads may be displayed indefinitely, only for a period of time after installation of the application software or until some other event occurs, e.g., the client pays a license fee. If the application software add-on decides to terminate display of the ads, operation ends. If not, display of the ads continues.

Figure 4:
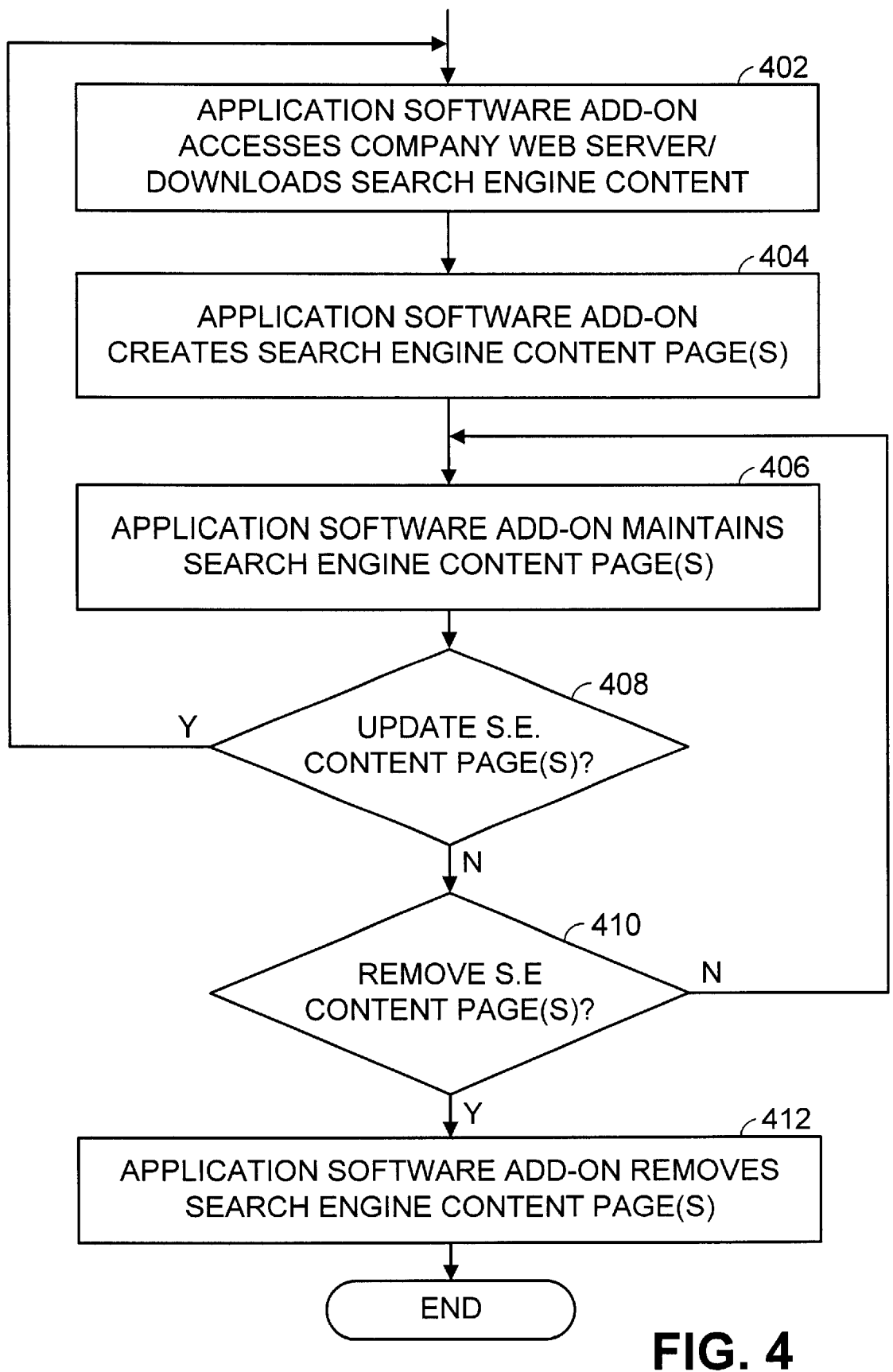
FIG. 4 is a logic diagram illustrating particular operations of the application software and application software add-on of the present invention in establishing search engine content pages intended to produce desired search engine results for search terms and phrases.

FIG. 4 is a logic diagram illustrating particular operations of the application software and application software add-on of the present invention in establishing search engine content pages intended to produce desired search engine results for search terms and phrases. As was previously described, one of the marketing functions that may be performed by the application software and/or the application software add-on is to manipulate search engines to cause particular search terms or phrases to return particular links. Such search engine manipulation is accomplished herein by populating web pages or other content on a ClWS, e.g., 106 and/or 108 with selected content. This selected content is then spidered by one or more search engines. Based upon the spidered content on the multiple ClWSs, the likelihood that a search engine will return the particular links corresponding to the search terms increases substantially.

For example, the company desires to populate web pages on more than one ClWS to manipulate multiple search engines so that when the search term "pork ribs" is entered into any of the multiple search engines, each of the search engines return the links www.joesbarbque.com as the number one search result. Because different search engines use different criteria in "ranking" each web site, multiple strategies must be employed to cause the particular search term to return a number one, or high ranking for the link. Examples of such strategies include populating multiple web pages with the link, each web page including the search terms as well. Such multiple web pages are preferably located on multiple web servers coupled to the Internet. As will be appreciated, these techniques must be changed over time to elicit the desired search engine behavior. Further, differing and varied population techniques must be used at any time since each search engine typically uses a unique set of criteria. Thus, a general operation to follow to produce the best results is to create a large number of pointers to the desired web page(s), populate a great number of web pages on a great number of web sites and vary the content on each search engine content page.

Thus, according to the present invention, when the application software loads upon a ClWS, the application software add-on accesses the CoWS and downloads search engine content (step 402). The search engine content may also be downloaded from a marketing content web server 120 or may be downloaded with the application software and/or the application software add-on. It may also be retrieved from a CD ROM upon which the application software and/or the application software add-on was provided. Then, the application software add-on creates search engine content pages and locates the pages upon the ClWS (step 404). The application software add-on maintains these search engine content pages (step 406) until it determines whether the search engine content pages should be updated (step 408). If the search engine content pages should be updated, additional/different content is downloaded (step 402) and operation continues. If not, the application software add-on determines whether to remove the search engine content pages (step 410) and removes the pages if so (step 412). However, if the search engine content pages are to remain, they continue to be maintained (step 406).

Figure 5:
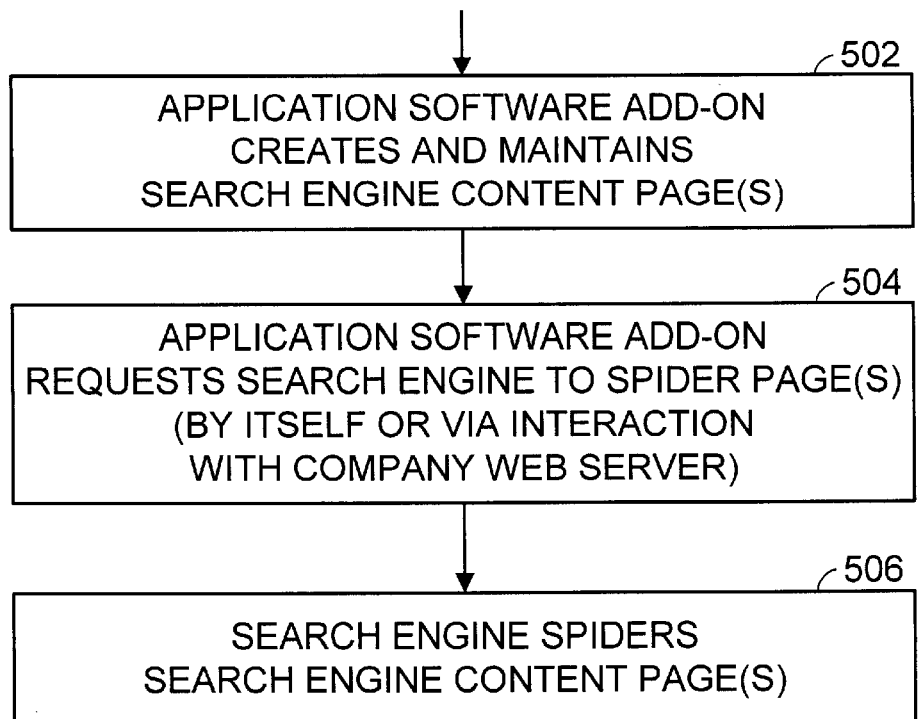
FIG. 5 is a logic diagram illustrating particular operations of the application software and application software add-on of the present invention in requesting a search engine spider to spider web pages installed at a client/licensee web site.

FIG. 5 is a logic diagram illustrating particular operations of the application software and application software add-on of the present invention in requesting a search engine spider to spider web pages installed at a client/licensee web site. After the creation of the search engine content pages, the application software add-on creates and maintains the search engine content pages (step 502). Then, the application software add-on requests at least one search engine to spider the search engine content pages (step 504). The spidering request is made either directly by the application software add-on or by the CoWS after interacting with the CoWS. If a request is made via interaction with the CoWS, the CoWS then sends a request to the search engine to spider the search engine content pages. In response to the request, the search engine then spiders the search engine content pages (step 506). With a sufficient number of the search engine content pages spidered, search terms or phrases for which the search engine content pages were built will return the desired links.

Figure 6:
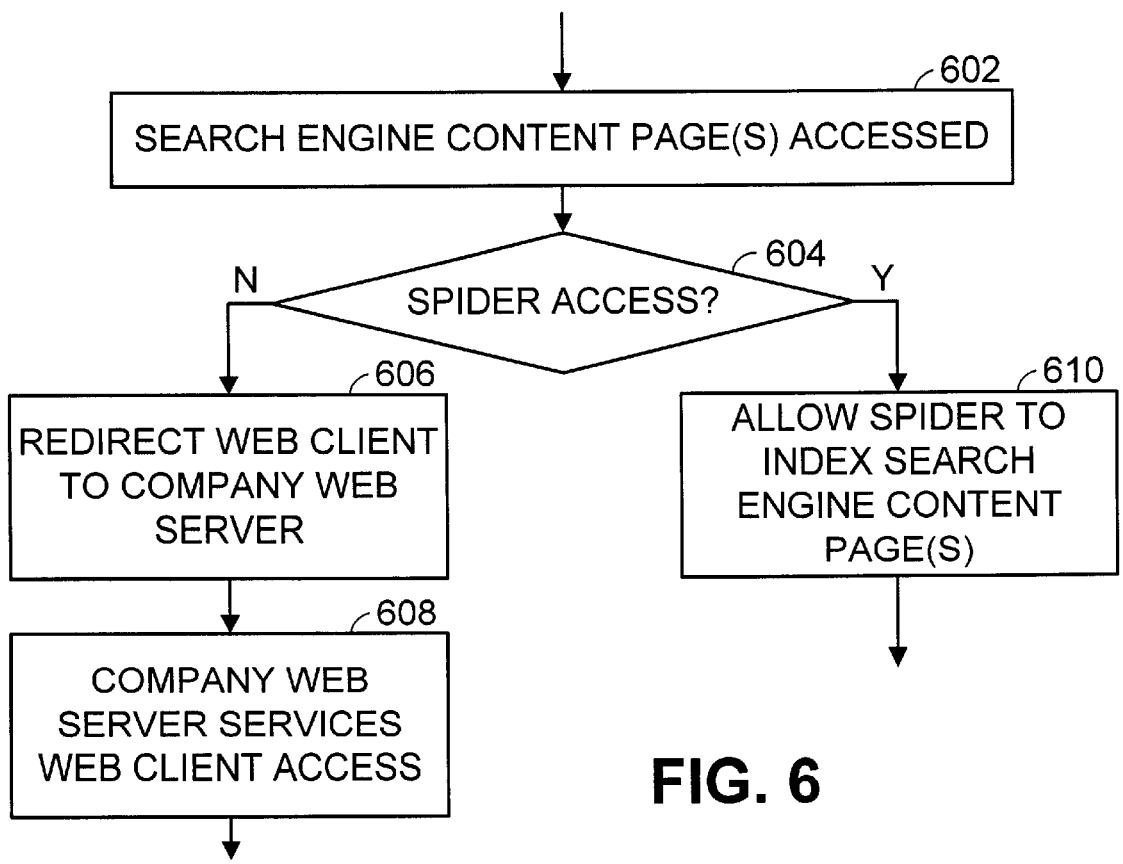
FIG. 6 is a logic diagram illustrating particular operations of the application software and application software add-on of the present invention in receiving and servicing a search engine spider access.

FIG. 6 is a logic diagram illustrating particular operations of the application software and application software add-on of the present invention in receiving a spider access. The operation of FIG. 6 is initiated when a search engine spider accesses a search engine content page (step 602). Upon such an access, the application software add-on is operated to determine whether the search engine spider should be redirected to the CoWS (step 604). If so, the search engine spider is redirected to the CoWS (step 606) and the CoWS services the spider access (step 608). If not, the application software add-on allows the search engine to index the search engine content page(s) being accessed (step 610).

Figure 7:
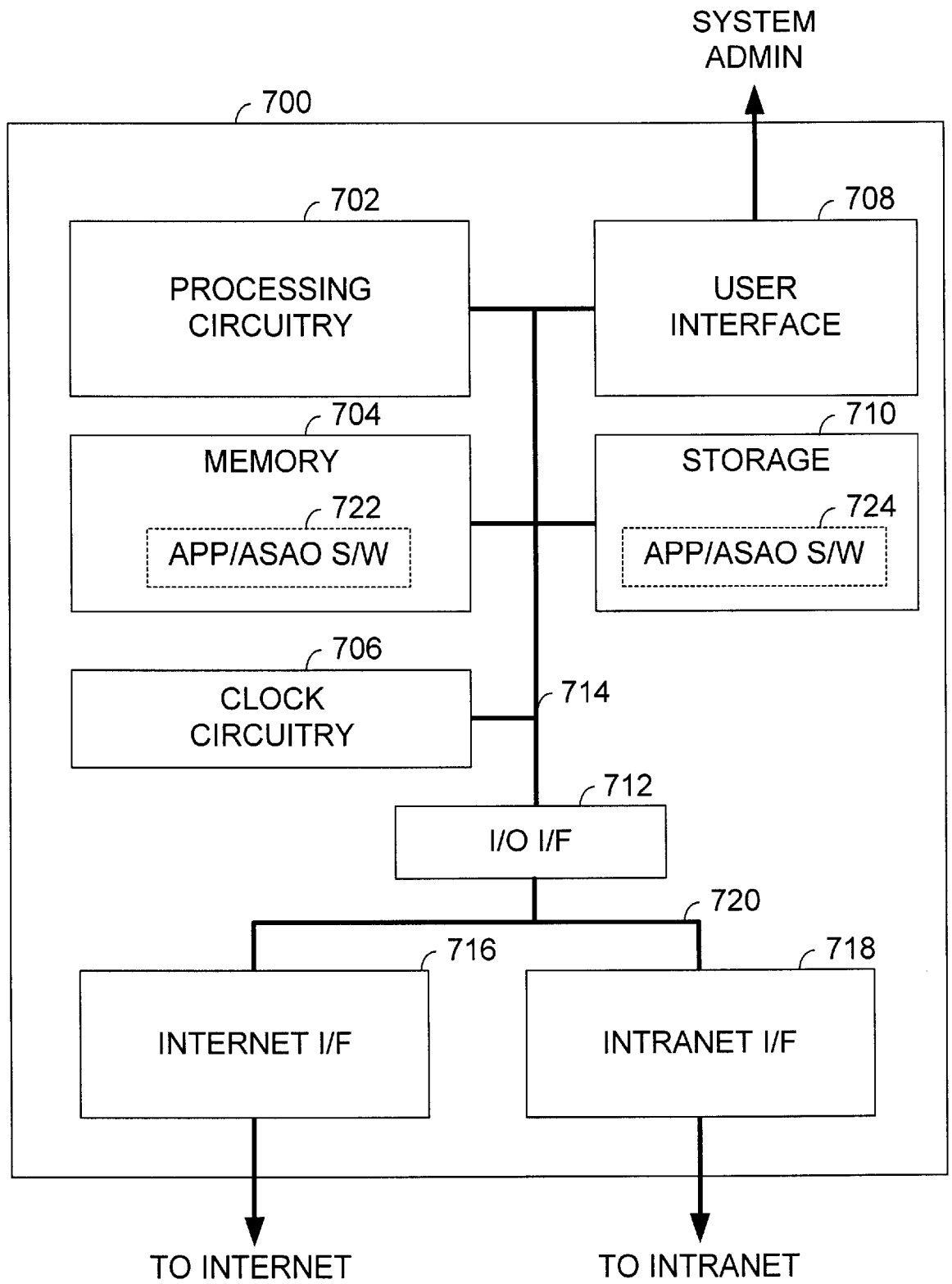
FIG. 7 is a block diagram generally illustrating the structure of a web server constructed according to the present invention.

FIG. 7 is a block diagram generally illustrating the structure of a web server constructed according to the present invention. The structure shown in FIG. 7 is that of a digital computer that has been specifically programmed to perform operations according to the present invention. However, a digital computer could be specifically constructed to perform the operations of the present invention as well. The web server illustrated may serve either as a ClWS or the CoWS. The operations described with reference to FIG. 7, however, will be those of a ClWS and not of a CoWS.

The web server 700 includes processing circuitry 702, memory 704 (e.g., DRAM, SRAM, EPROM, etc.), clock circuitry 706, a user interface 708 and storage 710 (e.g., hard disk drive, floppy disk drive, CD-ROM, DVD, tape drive, etc.) that intercouple via a processor bus 714. These components are generally known and will be described only as they relate to the present invention. The user interface 708 allows a user to access the various components of the web server 700. The web server 700 also includes an Intranet interface 718 and an Internet interface 716 that couple to the processor bus 714 via a PC bus 720 and an input/output interface 712. The Intranet interface 718 interconnects the web server 700 to an Intranet while the Internet interface 716 couples the web server 700 to the Internet.

According to the present invention, application software and application software add-on are loaded onto the web server 700 from a CoWS and are permanently stored in the storage 710 as instructions 724. Upon execution of the application software and/or application software add-on, the instructions 724 are loaded into memory as instructions 722 and executed. These software instructions 722 and 724 cause the components of the web server 700 to perform the functions previously described herein with reference to FIGS. 1 through 6.

Figure 8:
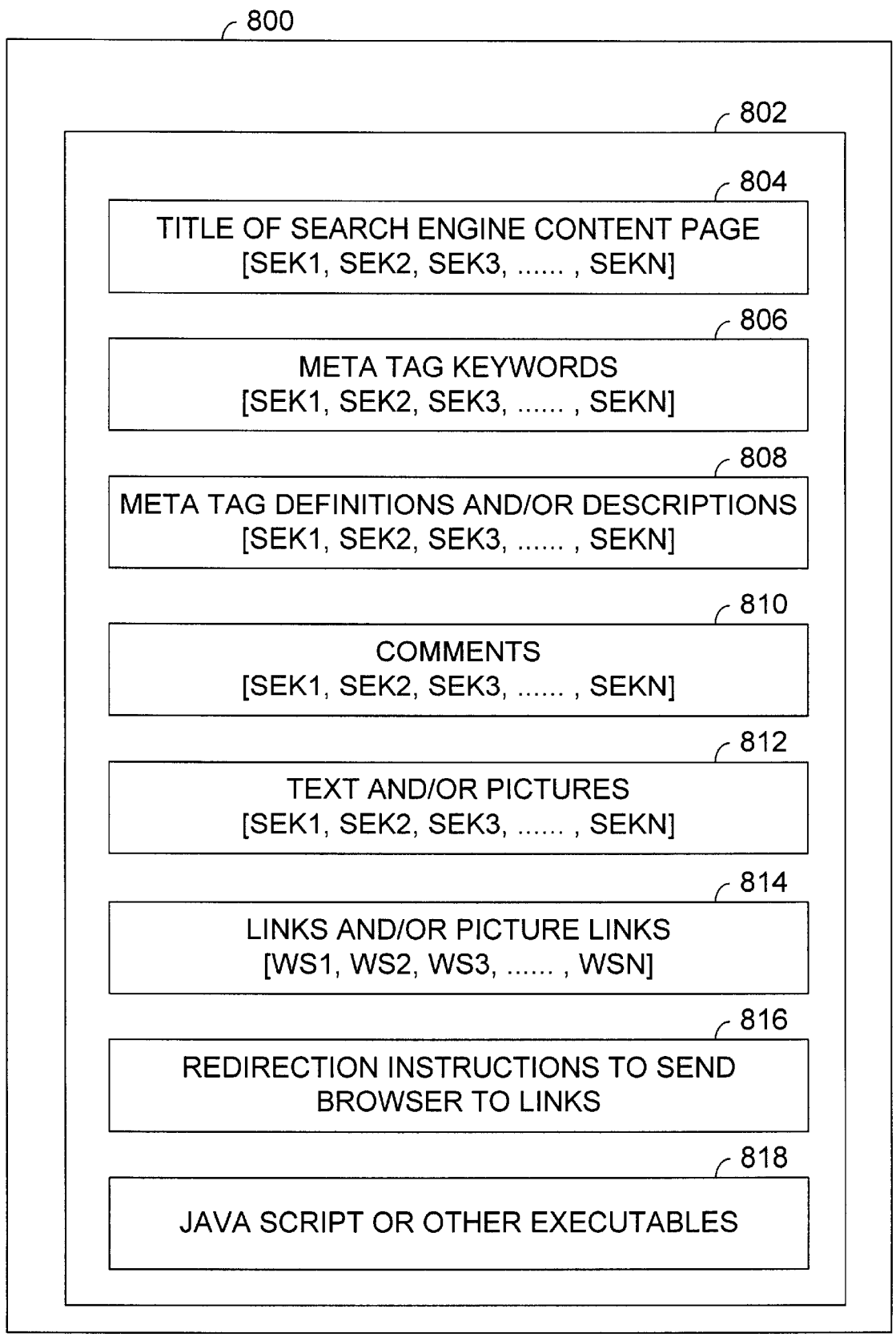
FIG. 8 is a block diagram illustrating one embodiment of a search engine content page constructed according to the present invention.

FIG. 8 is a block diagram illustrating one embodiment of a search engine content page constructed according to the present invention. As shown, the search engine content page 802 resides upon a ClWS 800 that is accessible via the Internet. The search engine content page 802 may include content intended for a particular search engine keyword (SEK) or for a plurality of search engine keywords. For generality in description, the search engine content page 802 of FIG. 8 shows entries for a number of SEKs. However, in a singular example, the entries of the search engine content page 802 would include only content for a single SEK.

The search engine content page 802 includes first a title 804. The search engine content page 802 also includes meta tag keywords 806, meta tag definitions and/or descriptions 808, comments 810 and text and/or pictures 812. At least some of the components title 804, meta tag keywords 806, meta tag definitions and/or descriptions 808, comments 810 and text and/or pictures 812 will always be present in the search engine content page 802. The search engine content page 802 also will include at least one of redirect instructions 816 and/or java script or other executables 818.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for performing enhanced marketing operations upon the Internet, the method comprising:
    downloading, across the Internet, an application program and an application program add-on from a company web server to each of a plurality of client web servers;
    installing the application program upon each of the plurality of client web servers;
    for each application program installed, installing the application program add-on upon the corresponding client web server;
    downloading marketing content from the company web server to each of the plurality of client web servers across the Internet, wherein the marketing content includes a search term and a link to a corresponding web site;
    upon each of the plurality of client web servers, creating at least one search engine content page that includes the search term and the link to the corresponding web site; and
    sending a request to a search engine to spider the plurality of search engine content pages residing on the plurality of client web servers so that a search performed on the search engine site for the search term will return the link to the corresponding web site.

2. The method of claim 1, wherein the application program is freely provided in exchange for allowing the creation of the search engine content pages on the plurality of client web servers.

3. The method of claim 1, further comprising:
    downloading advertisements to the plurality of client web servers; and
    displaying the advertisements to users of the application program.

4. The method of claim 3, further comprising displaying the advertisement upon a web page serviced by the client web server.

5. The method of claim 3, further comprising, upon an advertisement update event, downloading another advertisement from the company web server to the client web server across the Internet.

6. The method of claim 3, further comprising periodically downloading advertisements across the Internet.

7. The method of claim 3, wherein the advertisements include content that is selected based upon the client information.

8. The method of claim 1, wherein the application program add-on is installed upon the corresponding client web server during installation of the application program.

9. The method of claim 1, wherein the application program add-on is installed upon the corresponding client web server subsequent to the installation of the application program.

10. The method of claim 1, further comprising sending requests to a plurality of search engines to spider the plurality of search engine content pages.

11. The method of claim 1, wherein the application software add-on sends a request to the search engine to spider at least one corresponding search engine content page.

12. The method of claim 1, wherein:
    the application software add-on sends a request to the company web server to spider at least one corresponding search engine content page; and
    the company web server sends a request to the search engine for the search engine to spider the at least one corresponding search engine content page.

13. The method of claim 1, further comprising:
    detecting a web client access of a search engine content page; and
    redirecting the web client to the company web server.

14. A computer readable medium for use by a company web server and a plurality of client web servers, the computer readable medium comprising:
    a set of distribution instructions that, when operated upon by the company web server, cause the company web server to download, across the Internet, an application program and an application program add-on to a plurality of client web servers;
    a set of application program installation instructions that, when operated upon by a client web server of the plurality of client web servers, cause the client web server to install an application program upon the client web server;
    a set of application add-on instructions that, when operated upon by the client web server, cause the client web server to install an application program add-on;
    a set of marketing content download instructions that cause the client web server to download marketing content from the company web server across the Internet, wherein the marketing content includes a search term and a link to a corresponding web site;
    a set of search engine content creation pages that cause the client web server to create at least one search engine content page that includes the search term and the link to the corresponding web site; and
    a set of spidering request instructions that cause the client web server to send a request to a search engine to spider the at least one search engine content page.

15. The computer readable medium of claim 14, wherein the application program is freely provided in exchange for allowing the creation of the search engine content pages on the plurality of client web servers.

16. The computer readable medium of claim 14, further comprising a set of advertisement display instructions that cause the client web server to download advertisements from the company web server and to display the advertisement to a user of the application program.

17. The computer readable medium of claim 16, further comprising a set of advertisement display instructions that cause the client web server to display the advertisement upon a web page serviced by the client web server.

18. The computer readable medium of claim 16, further comprising a set of advertisement download instructions that cause the client web server to, upon an advertisement update event, download another advertisement across the Internet.

19. The computer readable medium of claim 16, further comprising a set of advertisement download instructions that cause the client web server to periodically download advertisements from the company web server to the client web server across the Internet.

20. The computer readable medium of claim 16, wherein the advertisements include content that is selected based upon the client information.

21. The computer readable medium of claim 14, wherein the application program add-on is installed upon the corresponding client web server during installation of the application program.

22. The computer readable medium of claim 14, wherein the application program add-on is installed upon the client web server subsequent to the installation of the application program.

23. The computer readable medium of claim 14, wherein the set of spidering request instructions cause a plurality of search engines to spider the at least one search engine content page.

24. The computer readable medium of claim 14, wherein the set of spidering request instructions cause the client web server to send a spidering request directly to the search engine.

25. The computer readable medium of claim 14, wherein:

the search engine spider request instructions cause the client web server to send a spidering request to the company web server; and the company web server sends a request to the search engine for the search engine to spider the at least one search engine content page.

26. The computer readable medium of claim 14, further comprising:

a set of web client detection instructions that cause the client web server to detect a web client of a search engine content page of the at least one search engine content page; and a set of web client redirect instructions that cause the client web server to redirect the web client to the company web server.

* * * * *